Patented Apr. 26, 1927.

1,626,579

UNITED STATES PATENT OFFICE.

CARL ARTHUR BAUMGARTEN-CRUSIUS, OF DRESDEN, GERMANY.

PROCESS FOR OBTAINING A CULTURE MIXTURE FOR FERTILIZER PRODUCTION.

No Drawing. Application filed February 12, 1926, Serial No. 87,942, and in Germany January 23, 1923.

It has been observed that after the usual rotting process the number of germs in stable manure has on the whole been considerably increased, but that the number of those germs which decompose cellulose has not increased to an extent comparable to the increase of other germs. Hitherto, it has not been demonstrated that the cellulose matter could be utilized by any biological process as nutriment for useful bacteria.

My invention relates to mixed cultures of cellulose fermenting organisms of different origins to be added to the matter to be rotted with the result that not only the number of cellulose decomposing germs increases in a satisfactory measure during the rotting process but that also the time consumed in the process is reduced. In accordance with the composition of the organic matter there are also different sorts of microbes at work in the rotting of the cellulose, which differ considerably as regards their power of decomposing. Consequently, where organic matter of different origin and composition is to be treated, for example the waste in towns, only mixtures of different sorts of such bacteria can guarantee an equally progressing decomposition in such a short time as is sufficient for practical purposes.

According to my invention I gather different aerobe and anaerobe sorts of cellulose decomposing bacteria out of forest ground, horse manure, cultivated land and of compost and culture them under conditions favourable to them and thus augment their number. These different sorts I unite in mixed cultures and add them to the organic matter.

In order to explain in a more detailed way I give the following example: I choose from cultivated land, from horse manure, compost and forest ground parts which are in a state of decomposition and, in order to annihilate in part or in toto unsuitable bacteria possibly contained therein, I heat them separately to about 60° C. for a period of 20 minutes. Then I divide each kind into two unequal portions. The smaller portion (A) I again divide and expose one part thereof to a temperature of 50° C. whilst it is loosely stored under aerobic conditions, the other part being exposed to the same temperature, keeping it however densely stored under anaerobic conditions and preventing admission of oxygen. The larger portion (B) I sterilize in a current of steam for subsequent use as a carrier for the culture obtained from the last two mentioned parts. As soon as the different cultures of said two mentioned parts increase extensively they are lixiviated with a colloidal solution of turf containing 0.1% sulfate of ammonium and 0.5% sugar and the resultant solution is combined with the preliminarily treated disintegrated nutrient material of the portion B.

At a temperature of 50° C. I observe now a quick augmentation of cellulose decomposing germs and obtain cultures with a high percentage of augmenting power. The latter I mix in suitable relations and add to a mixture, sterilized in steam, which consists of two parts of cultivated soil and one part each of finely divided horse manure and the leaves of beeches and of so much peat, that the finished mass contains 28–30% water. When kept at 50° C. the mixture is ready for use after 8 to 10 days.

For making rotten dung out of peat and faeces one cubic meter of the combined mass is mixed with 5 kgs. of the prepared germ substance and with 10 kgs. of ground Thomas slag and is stored in heaps. The mass thus inoculated gets very hot in a short time and the decomposition of the cellulose takes place in a considerably shorter time than without the said germs.

I made an experiment with peat the decomposition of which is specially difficult and which proves that in using mixed cultures of different sorts of cellulose decomposing germs the cellulose rots quicker. I give hereinafter the different degrees of decomposition by the amount of $CO_2$ produced in each case.

Under otherwise equal conditions one kilo
(a.) of moss-turf with water developed 1.70 g. of $CO_2$;
(b.) of moss-turf with a single culture of a cellulose decomposing sort of bacteria taken from forest ground 4.32 g. $CO_2$;
(c.) the same with a simple culture taken out of horse manure 7.74 g. of $CO_2$;
(d.) the same but the culture being taken out of cultivated land 2.20 g. of $CO_2$;
(e.) the same of compost 5.16 g. of $CO_2$;
(f.) of moss-turf with a mixed culture of the four sorts (b.)–(e.) 12.44 g. of $CO_2$.

I claim:
A process of obtaining a culture mixture for fertilizer production, which comprises subjecting a separate lot of decomposing farm soil, horse manure, forest soil and the like to a temperature of approximately 60° centigrade for a period of about 20 minutes in order to completely or partially destroy undesired bacteria, thereupon dividing said separate lot into two portions, sterilizing one of said portions, dividing the second of said portions into two separate parts, maintaining one of said parts under anaerobic conditions and the other part under aerobic conditions at a temperature favorable to the development of bacteria, thereupon lixiviating said two parts, adding the resulting liquid to the sterilized portion of said lot, mixing the thus inoculated portions together and adding said mixture to a mixture which contains food for the bacteria, and consists of farm soil, horse manure, beech leaves and peat.

CARL ARTHUR BAUMGARTEN-CRUSIUS.